INVENTOR
JOHN B. OSBORNE
BY S. H. Palmer
V. F. Davris
ATTORNEYS

Sept. 26, 1961   J. B. OSBORNE   3,001,931
METHOD AND APPARATUS FOR ENDOTHERMIC CATALYTIC REACTION
Filed June 22, 1954   2 Sheets-Sheet 2

INVENTOR
JOHN B. OSBORNE
BY
S. H. Palmer
U. F. Davies
ATTORNEYS

United States Patent Office 3,001,931
Patented Sept. 26, 1961

3,001,931
METHOD AND APPARATUS FOR ENDOTHERMIC CATALYTIC REACTION
John B. Osborne, South Orange, N.J., assignor to The M. W. Kellogg Company, Jersey City, N.J., a corporation of Delaware
Filed June 22, 1954, Ser. No. 438,538
6 Claims. (Cl. 208—164)

This invention relates to an improved method and apparatus for operating a fluid system. More particularly the invention relates to a fluid system which is especially adapted for conversion of hydrocarbons; the system is particularly suited for reforming light hydrocarbon oils.

It is a primary object of this invention to provide an improved method and apparatus for effecting chemical conversion by means of a fluid system.

It is also a primary object of this invention to provide a novel fluid system, and novel apparatus for carrying it out in practice, wherein the reactant gases are rapidly and intimately intermixed with the finely divided solid material and uniformly distributed therein as they enter the reaction zone for contact with the finely divided solid material.

It is also an object of this invention to provide a novel method, and novel apparatus for carrying it out in practice, for hydrocarbon conversion in the presence of finely divided catalytic solids wherein thermal cracking effects on the oil feed are substantially reduced.

The further objects and advantages of this invention will become apparent from the following description and explanation thereof.

The novel method and apparatus of this invention are applicable to fluid systems wherein finely divided solids are contacted with reactant gases in a reaction zone, contaminated finely divided solids are removed from the reaction zone and passed to a stripping zone wherein they are contacted with a gaseous stripping medium, the contaminated finely divided solids are passed from the stripping zone to a regeneration zone wherein they are regenerated by means of an oxygen containing gas, and the finely divided solids after regeneration are returned to the reaction zone for contact with the reactant gases introduced therein. I have found that in order to secure the maximum yield of desired products coupled with a maximum beneficial use of the finely divided solids and with a minimum contamination thereof, rapid and uniform intermixing of the finely divided solids and reactant gases is necessary. The rapid and uniform intermixing of the reactant gases with the finely divided solids in the proper sequence materially reduces, if it does not completely eliminate, undesired reactions. When the desired reaction is endothermic and the required heat of reaction is supplied into the reaction zone by a stream of gas which is not subject to an objectionable extent to undesired reactions, the uniform intermixing of all of the entrant gases with the finely divided solids in the proper sequence assures the proper heat distribution throughout the reactant gas and the finely divided solids in contact therewith so that the reactant gas components which are subject to undesired reactions are not raised above reaction temperature to promote the undesired reactions. In the reforming of light hydrocarbon oils uniform and rapid intermixing of the recycle gas, catalyst and naphtha feed, in this order, results in a material reduction in the holding time of the feed and a concomitant reduction in thermal cracking thereof and olefin production with the result that coke laydown on the catalyst is reduced with the reduction in olefin production and the reaction is initiated in a catalytic direction, thus reducing the possible hazard to product distribution occasioned by a preliminary thermal cracking.

The novel features of the present invention can be conveniently illustrated by the following specific embodiment pertaining to catalytic hydroforming of a petroleum naphtha stock. However, it should be understood that the scope of my invention includes fluid systems such as for example, hydrocarbon conversion, e.g., fluid catalytic cracking, cracking under hydrogen pressure, etc.; desulfurization; dehydrogenation; hydrocarbon synthesis; gas reversion; isomerization; isoforming; etc.

Referring to the drawings which form a part of this specification,

For catalytic hydroforming of hydrocarbon stocks the catalyst employed includes the metals of groups V and VI of the periodic system, more particularly, the oxides and/or the sulfides of the left hand elements of group VI, namely, chromium, molybdenum, tungsten, etc. These catalytic elements are used along or they are supported on a carrier material such as for example, alumina, silica, or combinations of the foregoing, zinc spinel, bauxite, kieselguhr, pumice, etc. A catalyst which is widely used is molybdenum oxide impregnated on "activated alumina" or alumina gel, in the amount of about 0.1 to about 25%, more usually 1 to 10%, based on the weight of the total catalyst. Another effective hydroforming catalyst is the noble metals, i.e., platinum, palladium, etc., either used alone or on suitable carrier materials such as alumina, silica, activated carbon, etc. The noble metals may be used in the same concentrations as the other catalysts above, but more usually they comprise about 0.5 to 5% by weight of the total catalyst. For the purpose hereunder, the catalyst is used in the form of a finely divided powder having particle sizes in the order of about 5 to 250 microns, preferably, about 10 to 100 microns. This catalyst is fluidized in the conventional manner to provide a dense fluidized bed. In general the superficial linear gas velocity is in the order of about 0.1 to 6.0 feet per second. This gas flow rate is measured as a superficial linear velocity, that is, the velocity of the gas passing through a vessel without any other materials present therein. The preferred superficial linear velocity is in the order of about 0.5 to 1.5 feet per second.

The gases in contact with the catalyst are the oil feed and hydrogen, the latter being provided as it suppresses carbon formation. Conveniently the oil feed ratio is expressed as a weight space velocity which is the weight rate of oil feed in pounds per hour per pound of catalyst in the reaction zone. For the hydroforming reaction, the space velocity defined as the pounds of oil feed to the reaction zone per hour per pound of catalyst present therein is generally about 0.05 to 10.0, or more, preferably about 0.25 to 2.5. The amount of hydrogen employed in hydroforming is defined as the standard cubic foot of hydrogen per barrel of oil feed (the barrel being of 42 gallons), abbreviated as s.c.f.b. Generally, hydrogen is employed at the rate of about 500 to 10,000 s.c.f.b., preferably about 1000 to 7500 s.c.f.b.

The temperature at which the hydroforming reaction is conducted is ordinarily in the order of about 910° F. but may vary from 750° F. to as high as 1075° F. The pressure may be varied in the range of from about 30 to about 1000 p.s.i.g., preferably about 50 to 500 p.s.i.g.

Figure 1:
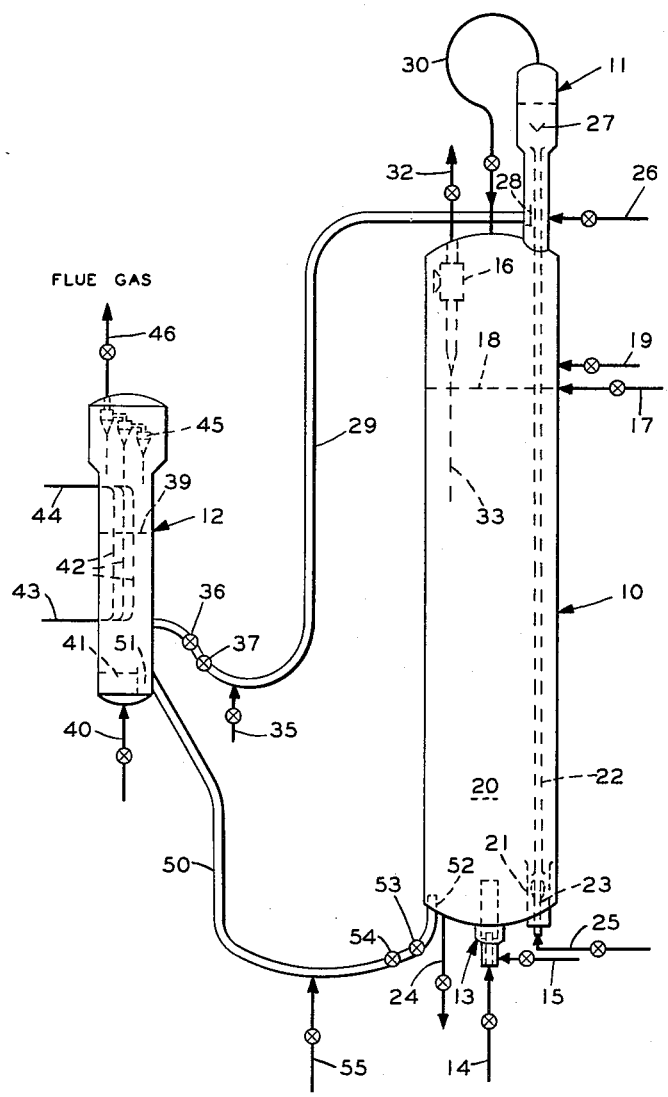
FIG. 1 is a schematic flow diagram of a specific form of the invention.

Referring to the drawings and particularly to FIG. 1 the apparatus illustrated for carrying out the novel hydroforming process includes a reactor tower 10 which mounts at its top a spent catalyst stripper vessel 11 and has connected thereto the regenerator vessel 12. The reactor 10 includes at the bottom thereof one or more mixing devices 13, one only being shown and to be more particularly described hereinafter, through which the naphtha and the hydrogen containing gas are introduced and intermixed with the catalyst. In a specific example of the application of the invention to the hydroforming of naphtha, a naphtha of a specific gravity of 56.3° A.P.I. is supplied at the rate of 12,780 b.p.s.d. (barrels per stream day)—(140,270 pounds per hour) to the mixing device 13 through the valved line 14. This naphtha prior to entering the mixing device 13 is heated as by passing it through a suitable furnace arrangement, not shown, to a temperature of about 960° F. while it is maintained at a pressure of about 265 p.s.i.g. The hydrogen containing gas is introduced into the mixing device 13 through valved line 15. The hydrogen containing gas may be derived from any convenient source but is preferably a hydrogen-rich recycle gas obtained by separation, in equipment not shown and in a manner well known to the art, from the product stream issuing from the reactor 10. The hydrogen-rich gas which will be referred to as recycle gas is supplied at the rate of about 5620.0 m.p.h. (mols per hour)—(56,550 pounds per hour) and is of 10.03 M.W. The recycle gas is heated in conventional apparatus, not shown, and is supplied at a temperature of about 1210° F. at about 265 p.s.i.g. pressure.

The reactor 10 for handling these quantities of reactant material is insulation lined in a conventional manner to minimize heat loss and has an inside diameter of about 14 feet four inches. The height of the reactor 10 is about 53 feet from the top of the mixing device 13 to the level of the inlet of the cyclone separator 16. One cyclone separator 16 has been indicated but it is to be understood that any convenient plurality thereof may be employed. The catalyst bed in the reactor 10 includes approximately 100 tons of catalyst and is some 38 feet deep. The vaporized naphtha and recycled gas fluidize the catalyst to a density of about 33 pounds per cubic foot. The weight of oil feed per pound of catalyst is about 0.7 w./hr./w. Solid catalyst material is recovered in a conventional manner from the product stream which issues from the reactor 10 and is returned to the reactor 10 as a catalyst slurry through the valved line 17. The line 17 introduces 38 b.p.s.d. (474 pounds per hour) of a naphtha having a specific gravity of about 35.0° A.P.I. This quantity of catalyst sludge includes about 67 pounds per hour of solid catalyst. As shown the line 17 opens into the reactor at about the level 18 of the fluid catalyst bed. The valved line 19 which opens into the reactor 10 somewhat above the level 18 is provided for loading the reactor with catalyst at start-up. The operations under the conditions stated provide in the reactor 10 a pressure of about 259 p.s.i.g. at the top of the mixing device 13 and a pressure of about 250 p.s.i.g. in the disengaging space of the reactor above the level 18 of the fluid catalytic bed. The temperature adjacent the top of the mixing device 13 is about 936° F. while that in the region of the top level of the fluid bed is about 910° F. The temperature at the inlet of the cyclone separator 16 is about 908° F.

Under these conditions the naphtha feed is converted to a product possessing a higher octane rating. The primary reaction involves dehydrogenation of naphthene compounds in the feed and to the lesser extent the aliphatic compounds of at least six carbon atoms are cyclized and dehydrogenated to produce aromatic compounds. As a result of these reactions a carbonized material is produced which contaminates the catalyst and causes the activity of the catalyst to decline. The activity is restored by removing the contaminated deposit. In the present example the catalyst of low activity is withdrawn from the lower end of the reactor 10 and passed to the spent catalyst stripper vessel 11 through a lift arrangement 20. This lift arrangement includes a circular well 21 which extends from the outside of the dished bottom of the reactor 10 to a distance above the top of the mixing device 13. Spent catalyst enters the well 21 and is conveyed upwardly in a tubular spent catalyst riser 22 by means of a gas which flows through the hollow conduit 23 disposed coaxially with the riser 22 within the well 21. The conduit 23 may or may not be of the movable type. The rate of solids flowing through the riser 22 may be regulated by adjusting the rate of gas flowing through the conduit 23 and/or adjusting the distance or clearance between the bottom of the riser 22 and the top of the conduit 23. The catalyst holdup for the reactor 10 may be reduced by withdrawing catalyst through a catalyst withdrawal line 24 which extends from the circular bottom of the reactor 10. The lift gas is preferably of the same composition and from the same source as the recycle gas of 10.03 M.W. and is supplied through the valved line 25 to the conduit 23 at the rate of about 459 m.p.h. (4607 pounds per hour).

The spent catalyst flows upwardly through the riser 22 and enters the spent catalyst stripper 11 which is an elongated, generally cylindrical vessel superimposed on the reactor 10, and as shown, is offset from the center line thereof. The stripper 11 is lined in a conventional manner and has an inside diameter of some 5 feet 4 inches with an overall length of about 55 feet 6 inches, the catalyst level being some 30 feet above the top of the reactor 10. The riser 22 extends through the lower section of the stripper 11 to somewhat above the middle of the depth of catalyst therein. A stripping gas, as for example steam, is introduced through the valve line 26 at the rate of about 4560 pounds per hour, this quantity of stripping gas is found satisfactory for the catalyst-oil ratio of about 0.8 employed in this example. In order to avoid excessive turbulence caused by the introduction of spent catalyst into the stripper 11, a baffle 27 is positioned above the discharge opening of the riser 22. The stripped solids leave the stripper 11 through the well 28 located at the lower end of the stripper 11 and from thence through a spent catalyst transfer line 29 opening therein. The gases leave the stripper 11 overhead through the valved overhead line 30 to be conducted to the top of the reactor 10. In the present example the pressure at the top of the stripper 11 is about 250.1 p.s.i.g. and the temperature is about 877° F. Due to the head of the catalyst in the stripper, the pressure at the bottom of the well 28 is about 256.6 p.s.i.g. The temperature in the transfer line 29 is about 843° F. By means of the valve in the line 30 it is possible to regulate the pressure in the stripper 11 to a value sufficient to assure the mentioned flow of the stripped gases into the reactor 10. By increasing the pressure in the stripper the overall height of the reactor and stripper can be reduced and thereby making it possible to reduce construction costs.

In the upper part of the reactor 10 above bed level 18, gases are disengaged from the solids and flow into the cyclone separator 16. The separated gases, the product of the process, leave the cyclone separator 16 through the valved product line 32 for passage to further processing equipment, not shown, wherein the product is treated in any preferred conventional manner and the recycle gas is separated. The product outflow through the line 32 is 9193.4 m.p.h. (212,051 pounds per hour) of 23.07 M.W. material. The separated solids from the cyclone 16 are returned to the reactor bed through a drainpipe or dipleg 33.

In the present example, the stripped catalyst will be withdrawn from the stripper 11 through the transfer line 29 at the rate of about 113,270 pounds per hour (112,220 pounds of catalyst and 1,050 pounds of coke) and enters said transfer line at a density of about 36 pounds per cubic foot. The standpipe 29 is about 8 inches in diameter and the solids flow therethrough at the rate of about 2.77 feet per second. The solid catalyst is aerated by introducing aerating gas, such as for example steam, at the rate of about 803 pounds per hour, into the pipe 29 adjacent its lower end through the valved line 35. The rate of catalyst flow through the pipe 29 is controlled preferably automatically by means of a slide valve 36, for safety and control reasons an auxiliary valve 37 is installed adjacent the slide valve 36. By reasons of the head of fluidized catalyst in the pipe 29 the total pressure above the valve 36 is about 267.1 p.s.i.g. The pressure drop across the valve 36 is about 8.7 pounds p.s.i. The spent catalyst leaves pipe 29 and enters the regenerator vessel 12 which as shown, is a vertically disposed generally cylindrical, internally lined vessel of an effectve internal diameter of about 6 feet 4 inches and of a height of about 42 feet measured to the inlet level of the cyclones 45. The catalyst bed within the regenerator 12 has its level at 39 and has a density of about 36 pounds per cubic foot. The catalyst is regenerated in the vessel 12 by burning the contaminating deposits in an oxygen-containing gas which is introduced through valved line 40 into the bottom of the regenerator 12. The oxygen-containing gas, air in this example, enters the regenerator 12 below a grid plate 41 which distributes the air uniformly over the cross sectional area of the regenerator 12. The air is supplied through the line 40 at the rate of about 19355 pounds per hour under a pressure of about 294.3 p.s.i.a. By contacting the air with the spent catalyst in the regenerator 12 the temperature of the solids increases due to combustion of the contaminating material. In the case when using 9% by weight of molybdenum oxide supported on alumina as the catalyst, the temperature of regeneration is maintained at about 1100° F. at 263.0 p.s.i.g. The temperaturer is maintained at this level by means of a plurality of vertical heat exchange tubes 42 which are directly in contact with the catalyst bed and through which flows a heat exchange medium. In this example the heat exchange medium is water which is supplied through a line 43 from a convenient source. The steam produced by evaporation of water in the tubes 42 is removed through line 44 and conducted to a point of use or disposal. The flue gas leaving the catalyst bed in regenerator 12 usually contains entrained solids which are separated therefrom by means of the cyclone separators 45 which are located in the upper section of the regenerator 11 and may be serially connected as shown. The outlet from the last of the cyclones 45 is connected to the flue gas line 46 which leads to a stack or other disposal means.

The regenerated catalyst leaves the regenerator 12 through the line or standpipe 50 which opens into the bottom of the regenerator 12. The line 50 is also of about 8 inches in diameter. The catalyst in line 50 has a density of about 36 pounds per cubic foot. The lower end of the pipe 50 opens in a short standpipe 52 in the bottom of the reactor 10. Flow through the pipe 50 is controlled automatically by the slide valve 53, an auxiliary valve 54 is also provided. The pressure drop across the valve 53 is about 8.6 pounds. The catalyst while in the line 50 is aerated by air admitted therein through the valved line 55 at a rate of about 1030 pounds per hour. The reactivated catalyst enters the reactor 10 at the rate of about 112,220 pounds per hour.

Figure 2:
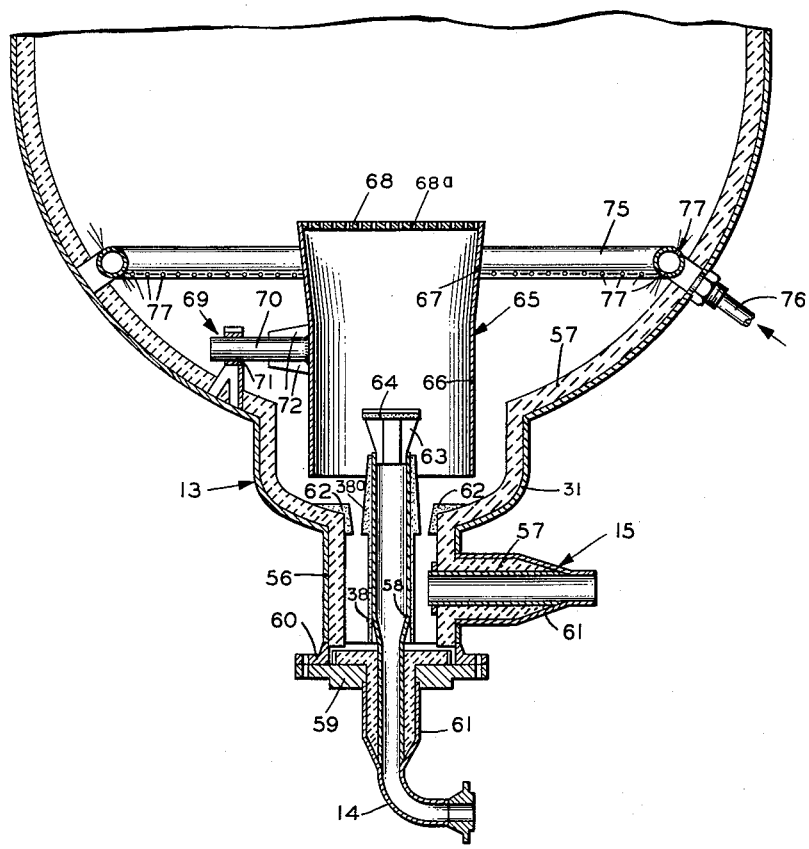
FIG. 2 is a fragmentary vertical section of a reactor tower showing the novel mixing arrangement positioned centrally in the bottom thereof.

The hydroforming reaction is endothermic so that it is necessary to supply heat of reaction into the reactor 10 in order to obtain a desired level of conversion. In accordance with the present invention a large portion of the heat of reaction is supplied through the hydrogen containing recycle gas introduced into the mixing device 13 through the line 15. The regenerated catalyst which enters the reactor 10 through the standpipe 52 is at a higher temperature than the naphtha feed and has greater activity than the average activity of the remainder of the catalyst in the reactor 10. In order to avoid any undesirable effects which might occur when the regenerated catalyst contacts the naphtha feed directly, the regenerated catalyst is introduced at such a level and at such a location in the reactor 10 that it has an opportunity to intermix with the catalyst already in the reactor 10 before movement to the mixing device 13 and intermixture thereat as will be apparent, first with the recycle gas and then together with the recycle gas with the naphtha feed. Thus the contacted naphtha feed will be catalyzed by a bed of material which is uniform in activity at the desired temperature and will not be subjected to excessive temperatures or excessively active catalyst. The order of mixing indicated just above assures a minimum of thermal cracking effects with the result that coke laydown and olefin production are materially reduced. The indicated order of mixing furthermore insures against possible hazard to product distribution. In the indicated order of mixing the required heat is added without excessively heating the catalyst to a harmful extent or heating the naphtha to temperatures whereat substantial thermal cracking is initiated. Furthermore, uniform distribution of the naphtha feed, recycle gas feed and regenerated catalyst is obtained. The mixing device 13 which is best shown in FIG. 2, makes possible the obtaining of these highly desirable results and yet avoids excessive pressure drops and/or entrance velocities which cause catalyst attrition.

The mixing device 13 includes a well defining cylindrical boot 31 which extends from the bottom head of the reactor 10 and into which opens the top end of the cylindrical member 56 that defines the recycle entry chamber. The boot 31 and the cylindrical member 56, like the reactor 10, are internally lined with a heat insulating lining material 57 which is a resistant refractory material and is held in position against the respective wall by means of holding devices conventional in the art and not shown. The material 57 is a cement-like castable material of any preferred composition. The well within the boot 31 has an internal diameter of about 4 feet 7 inches. The line 15 opens through the wall of the cylindrical member 56 to feed the recycle gas into the annular recycle entry chamber in which is centrally positioned the tubular extension 58 of the naphtha line 14. The line 14 passes centrally through the closure member 59 which closes the bottom of the cylindrical member 56 and is removably connected to a suitable flange 60 thereof in any convenient manner, as for instance by bolts. The lines 14 and 15 at and adjacent the cylindrical member 56 and the closure member 59 are also lined with the lining material 57. To hold this lining material 57 in place the sleeves 61 are employed which are welded at one end to the respective line 14 or 15 and the other end to the respective contiguous portion of the cylindrical member 56 or the closure member 59.

To prevent excessive wear due to corrosion and/or erosion which would result from the direct contact of the highly heated recycle gas with the walls of the tubular member 58, the external surface of the tubular member 58 is covered with a protective lining sleeve 38 of hard, refractory material. It is at present preferred for this purpose to form the lining 38 of a refractory carbide, boride, silicide, and the like, silicon carbide being preferred in this instance. The upper end 38a of the lining sleeve 38 is enlarged and tapered as shown so that in cooperation with the annular lining piece 62 it provides an annular nozzle of controlled area whose cross section expands upwardly so that the recycle gas flowing therethrough will be directed upwardly at a predetermined velocity. The lining piece 62 is also formed of a hard, refractory material and at present preferably of silicon carbide. The tubular member 58 extends well into the well formed by the boot 31 and carries at its upper end the deflection member 63 which as shown is of cross, cross-section and formed by four connected gussets whose lower ends are attached to the tubular member 58 to be supported thereby and whose upper ends are enlarged so as to provide the proper outward deflection for the naphtha feed. The deflection member 63 includes a top piece 64 which closes the space between the radially extending gussets and is formed of a hard, refractory material preferably silicon carbide backed by steel.

A cylindrical grid barrel 65 is supported concentrically relative to the tubular member 58 and with its lower end extending well within the boot 31. The grid barrel 65 is formed of a straight sided lower portion 66 and an upwardly flaring frusto conical upper portion 67. The overall length of the grid barrel 65 is about 5 feet, the upper portion 67 being about 2 feet long and the lower portion 66 has an inside diameter of about 3 feet 3 inches while the maximum inside diameter of the upper portion is about 3 feet 8 inches. The upper portion is closed by a disc member 68 which is perforated over the full surface thereof by a plurality of holes 68a of about two inches in diameter to form a grid whose main functions are to equalize the flow out of the grid barrel 65 and to break up any gas bubbles that may reach it. The grid barrel 65 is supported on trunnion arrangements 69 so that it may freely expand in all directions. In the present example three such trunnion arrangements 69 equi-spaced around the grid barrel 65 are employed. Each trunnion arrangement 69 includes a tubular element 70 which has one end attached to the grid barrel 65 and the other end supported in a bearing piece 71. Reinforcing members such as the gussets 72 which attach to the grid barrel 65 and to the tubular member 70, may be employed.

The distributor or mixing device 13 is proportioned and arranged to induce the circulation of catalyst at a flow rate many times that of the naphtha feed. The distributor 13 as above described and for the flow rates for the specific example above delineated, is proportioned to produce the desired results at a catalyst-oil ratio of about 25. At this ratio the temperature of the naphtha-recycle gas-catalyst mixture is only about 30° above that of the caalyst bed in the reactor 10 and there is no extreme temperature rise when the naphtha feed and the recycle gas mix in the presence of the circulating catalyst.

In hydroforming the best results are expected when the naphtha feed contacts the catalyst in the presence of recycle gas but without overheating. Since the recycle gas is heated to a considerably higher temperature than the naphtha which is more subject to undesired thermal cracking, the gas supplies most of the heat of the reaction to the reactor bed in the reactor 10. Quick and efficient mixing of the catalyst naphtha and recycle gas is desired.

The distributor or mixing device 13 described, consists of an assembly of concentric cylinders 65 and 58 enclosed in the well of the boot 31 extending downward through the bottom head of the reactor 10. The naphtha feed vapor is fed through the central tubular member 58 which extends upwardly in this well. Around the central tubular member 58 is an annular chamber into which the recycle gas is discharged from line 15. This annular recycle entry chamber has an annular opening at its top of controlled size through which the recycle gas flows upwardly into the well evenly distributed around the naphtha feed tubular member 58. In the well is the grid barrel 65 which is of larger diameter than the upward flowing recycle gas annulus. The open lower end of the grid barrel 65 is spaced from the inner wall of the boot 31 to give a definite area between it and the bottom of the well. This opening is sized to result in a definite pressure drop, in this case about ½ p.s.i., when the catalyst flows inward through it at the desired rate. The catalyst feeding this opening flows downwardly from the reactor bed and along the bottom head of the reactor 10 and the opening is sized to give a flow velocity of about 3 to 5 feet per second between the outside of the cylinder 66 and that portion of the inside surface of the grid barrel 65 that defines the well. The cylinder 66 is sized to give an upward superficial velocity of 15 to 20 ft./second for the naphtha and gas. This velocity will move the catalyst upward at the rate required for a 25/1 catalyst/ oil ratio and a density of 6 to 7 pounds per cubic foot. The grid 68 is designed to give a pressure drop of about ½ p.s.i.g. at the flow rates set forth above. As stated the height of the grid barrel 65 is set at 5 feet which in this case will supply a sufficient differential density between the inside and the outside thereof to cause catalyst circulation at the desired rate. At this rate the pressure caused by the difference in densities is balanced by the sum of the pressure drops through the grid 68 and the opening below the cylinder 65.

Figure 3:
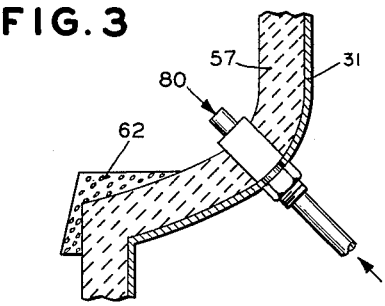
FIG. 3 is a view similar to FIG. 2 showing a modified construction.

It has been found that under certain operating conditions the separated catalyst resting on the bottom head of the reactor 10 does not flow uninterruptedly and at a sufficiently uniform rate downwardly into the well formed by the boot 31. To overcome this difficulty and to assure a continuous and uniform operation, an aeration ring 73 may be provided and aeration medium supplied thereto through the line 76. Even moderate quantities of aeration medium will sufficiently fluidize the dead catalyst inventory held on the bottom head to insure a smooth, uniform and continuous downward movement. The aeration ring 75 may be provided with holes 77 therein oriented as shown in FIG. 2. It has also been found that under some conditions of operation the results can be improved by aerating the catalyst in the bottom of the well defined by the boot 31 to prevent settling of catalyst in the hip of the well which results in non-uniform catalyst flow. For this purpose a plurality of small aeration nozzles 80, as shown in FIG. 3, are provided. The aeration may be any suitable readily available gas, as for instance recycle gas.

While only one mixing device 13 is shown in the above referred to embodiment of the apparatus of the invention it is, of course, understood that this is illustrative only and that the invention is not limited thereto. It is contemplated when circumstances warrant it, to employ a plurality of such mixing devices 13 in the bottom of the reactor 10, such plurality being arranged in any preferred manner, as for instance, spaced along a circle on the axis of the reactor 10.

Although many changes can be made by those skilled in the art without departing from the scope of the invention, it is intended that all matter contained in the above description and appended claims and shown in the accompanying drawings shall be interpreted as illustrative and not limitative.

I claim:

1. An apparatus comprising a vessel of comparatively large transverse area adapted to contain a fluidized mass of finely divided solids, and distributor means of comparatively small transverse area for distributing gasiform material into said fluidized mass to maintain the fluidized condition thereof, said distributor means including concentric cylindrical members at the bottom of said vessel defining an annular passageway, the upper end of the outer of said members located below the upper end of the inner of said members and positioned for flow of finely divided solids into said passageway, the lower end of said inner member positioned above the lower end of said outer member to provide an annular entrance port from said passageway into the internal space of said inner member, an annular nozzle positioned beneath said port adapted to direct a stream of gas past said port and into said internal space, means for supplying gas to said nozzle, said nozzle and port proportioned to provide a zone of reduced pressure at and adjacent said port thereby to induce flow of finely divided solids into said inner space, and means for supplying gasiform material into said gas stream intermediate the ends of said inner member.

2. An apparatus comprising a vessel of comparatively large transverse area adapted to contain a fluidized mass of finely divided solids, and distributor means of comparatively small transverse area for distributing gasiform material into said fluidized mass to maintain the fluidized condition thereof, said distributor means including substantially concentric cylindrical members at the bottom of said vessel defining an annular passageway, the upper end of the outer of said members located below the upper end of the inner of said members and positioned for flow of finely divided solids from the bottom of said vessel into said passageway, the lower end of said inner member positioned above the lower end of said outer member to provide an annular entrance port from said passageway into the internal space of said inner member, a tubular member concentrically positioned in said inner member, extending upwardly therein above said entrance port and terminating in a laterally directing discharge element, means for supplying gasiform material into said tubular member, an annular nozzle surrounding said tubular member and positioned beneath said port adapted to direct a stream of gas past said port and into said internal space, means for supplying gas to said nozzle, said nozzle and port proportioned to provide a zone of reduced pressure at and adjacent said port thereby to induce flow of finely divided solids into said inner space, and foraminous means closing the upper end of said inner member.

3. A process which comprises contacting a chemical reactant with a fluidized mass of finely divided solid contact material in a reaction zone under endothermic conditions to produce a desired product, flowing a stream of gas through a confined region in communication with the bottom of said reaction zone at a velocity controlled to reduce the pressure thereat sufficiently to move finely divided solid contact material at the bottom of the reaction zone thereinto, intermixing the finely divided solid contact material moved into said region with the gas flowing therethrough to provide a fluidized stream, injecting a chemical reactant into said fluidized stream, and directing the resulting fluidized mixture into the lower end of said reaction zone to maintain the fluidized condition of said mass therein, the temperature of said finely divided contact material moving into said confined zone being in the order of the reaction temperature, the temperature of said chemical reactant as it is injected into said fluidized stream being in the order of the reaction temperature but below the temperature of significant thermal decomposition thereof, and the temperature of said stream of gas as it is supplied to said confined region being sufficiently above the reaction temperature to supply the heat required by the endothermic reaction and not supplied by the finely divided contact material.

4. A hydrocarbon conversion process which comprises contacting a hydrocarbon reactant with a fluidized mass of finely divided hydrocarbon conversion catalyst in a reaction zone under endothermic conditions to produce a desired product, flowing a stream of gas through a confined region in communication with the bottom of said reaction zone at a velocity controlled to reduce pressure thereat sufficiently to move finely divided hydrocarbon conversion catalyst at the bottom of said zone thereinto, intermixing the finely divided catalyst moved into said region with the gas flowing therethrough to provide a fluidized stream, injecting a hydrocarbon reactant into said fluidized stream to substantially uniformly intermix said hydrocarbon reactant in said fluidized stream, and directing the resulting fluidized mixture into the lower end of said reaction zone to maintain the fluidized condition of said mass therein, the temperature of said finely divided catalyst moving into said confined zone being in the order of the reaction temperature, the temperature of said hydrocarbon reactant as it is injected into said fluidized stream being in the order of the reaction temperature but below the temperature of significant thermal decomposition thereof and the temperature of said stream of gas as it is supplied to said confined region being sufficiently above the reaction temperature to supply the heat required by the endothermic reaction not supplied by the finely divided contact material.

5. A reforming process which comprises contacting a light hydrocarbon oil with a fluidized mass of finely divided reforming catalyst in a reaction zone under endothermic conditions to produce a reformed product, flowing a stream of gas through a confined region in communication with the bottom of said reaction zone at a velocity controlled to reduce pressure thereat sufficiently to move finely divided reforming catalyst at the bottom of said zone thereinto, intermixing the reforming catalyst moved into said region with the gas flowing therethrough to provide a fluidized stream, injecting a light hydrocarbon oil into said fluidized stream to substantially uniformly intermix said hydrocarbon oil in said fluidized stream, and directing the resulting fluidized mixture into the lower end of said reaction zone to maintain the fluidized condition of said mass therein, the temperature of said finely divided reforming catalyst moving into said confined zone being in the order of the reaction temperature, the temperature of said light hydrocarbon oil as it is injected into said fluidized stream being in the order of the reaction temperature but below the temperature of significant thermal decomposition thereof, and the temperature of said stream of gas as it is supplied to said confined region being sufficiently above the reaction temperature to supply the heat required by the endothermic reaction and not supplied by the finely divided contact material.

6. A hydrocarbon process which comprises contacting a naphtha fraction with a fluidized mass of finely divided molybdenum oxide catalyst in a reaction zone under endothermic conditions to produce a reformed product, flowing a stream of hydrogen-rich gas through a confined region in communication with the bottom of said reaction zone at a velocity controlled to reduce pressure thereat sufficiently to move finely divided molybdenum oxide catalyst at the bottom of said zone thereinto, intermixing said catalyst moved into said region with the hydrogen-rich gas flowing therethrough to provide a fluidized stream, injecting a naphtha fraction into said fluidized stream to substantially uniformly intermix said naphtha fraction in said fluidized stream, and directing the resulting fluidized mixture into the lower end of said reaction zone to maintain the fluidized condition of said mass therein, the temperature of said catalyst moving into said confined zone being in the order of the reaction temperature, the temperature of said naphtha fraction as it is injected into said fluidized stream being in the order of the reaction temperature but below the temperature of significant thermal decomposition thereof and the temperature of said stream of hydrogen-rich gas as it is supplied to said confined region being sufficiently above the reaction temperature to supply the heat required by the endothermic reaction and not supplied by said catalyst.

References Cited in the file of this patent

UNITED STATES PATENTS

| | | |
|---|---|---|
| 2,582,710 | Martin | Jan. 15, 1952 |
| 2,651,565 | Bergman | Sept. 8, 1953 |
| 2,695,866 | McGrath | Nov. 30, 1954 |
| 2,696,461 | Howard | Dec. 7, 1954 |
| 2,698,281 | Leffer | Dec. 28, 1954 |
| 2,727,810 | Leffer | Dec. 20, 1955 |
| 2,732,330 | Krebs et al. | Jan. 24, 1956 |
| 2,740,750 | Howard | Apr. 3, 1956 |